United States Patent
Planner

[15] 3,657,856
[45] Apr. 25, 1972

[54] METHOD AND APPARATUS FOR PLEATING AND SEALING TUBE WRAPPERS

[72] Inventor: Thomas H. Planner, Appleton, Wis.
[73] Assignee: Kimberly-Clark Corporation, Neenah, Wis.
[22] Filed: Dec. 8, 1969
[21] Appl. No.: 882,868

[52] U.S. Cl. ................................53/28, 19/144.5, 53/180
[51] Int. Cl. ....................A61f 13/20, A61l 15/00, B65b 9/06
[58] Field of Search ......................53/28, 180, 182; 19/144.5

[56] References Cited

UNITED STATES PATENTS

| | | | |
|---|---|---|---|
| 2,747,346 | 5/1956 | Tigerman et al. | 53/182 X |
| 3,020,599 | 2/1962 | Pukis et al. | 19/144.5 |
| 3,090,174 | 5/1963 | Kraft | 53/28 X |
| 3,201,913 | 8/1965 | Kopp | 53/182 |
| 3,303,630 | 2/1967 | Harm | 53/182 X |
| 3,513,629 | 5/1970 | Hoagland et al. | 53/182 |

Primary Examiner—Theron E. Condon
Assistant Examiner—Eugene F. Desmond
Attorney—Wolfe, Hubbard, Leydig, Voit & Osann

[57] ABSTRACT

An apparatus and method for simultaneously tuck-inpleating and heat sealing tube wrappers using rotatably driven tucking fingers and rotatably driven heat sealing elements which mesh with the tucking fingers.

4 Claims, 7 Drawing Figures

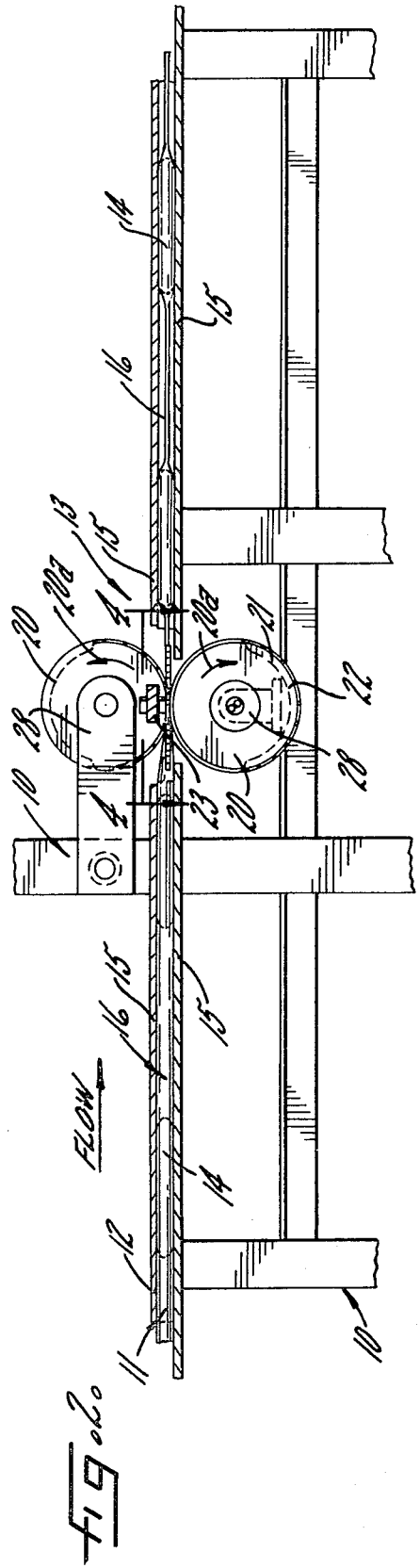

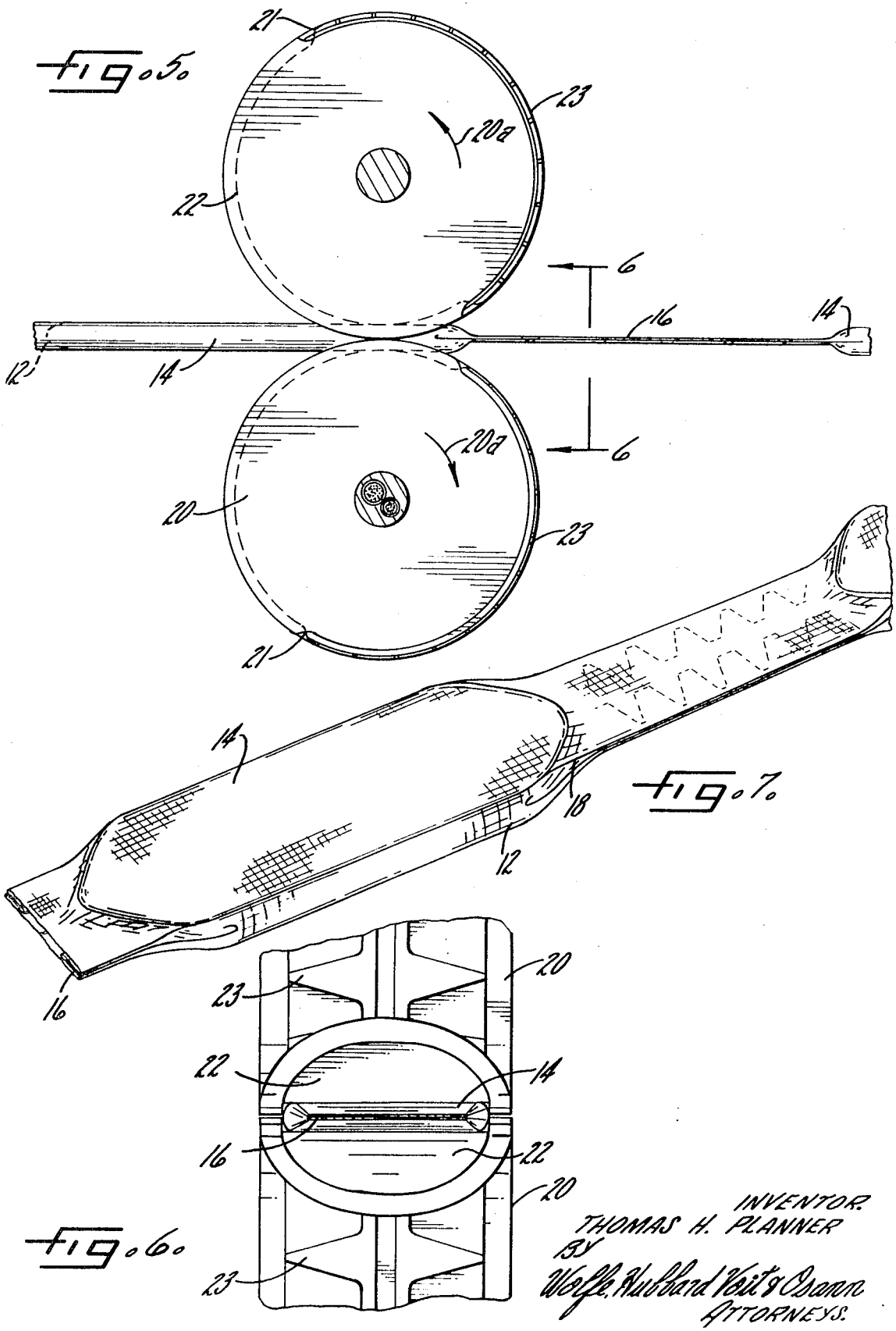

METHOD AND APPARATUS FOR PLEATING AND SEALING TUBE WRAPPERS

BACKGROUND OF THE INVENTION

This invention relates to an improved apparatus and method for tuck-inpleating and sealing tube wrappers.

Many products such as candy bars, sanitary napkins, pads, and the like, are assembled in a tubular wrapper. In the manufacture of sanitary napkins, for example, the individual napkin pads comprise a fluid absorbent material such as multiple plies of cellulosic material, various types of fluid absorbent synthetic materials, and are enclosed in a tubular wrapping of a woven gauze, a nonwoven scrim or similar material. In the manufacture of many other individually wrapped products such as candy bars, the tubular wrapping may be cellophane, waxed paper, or sheet plastic.

In the high speed manufacturing of such products, the individual objects to be wrapped are typically placed on a continuously moving belt of wrapping material at equally spaced and pre-determined intervals with the moving belt of wrapper material wide enough so that it can be folded over to completely enclose the objects to be wrapped. After folding, the wrapper material is sealed to form a continuous tube. In the manufacture of sanitary napkins the sealing may be achieved by activating a thin line of heat activatable adhesive that has been previously placed along one edge of the pad wrapper material. This adhesive may be color coded so as to enable the napkin user to position the seamed side of the napkin either in contact with or away from the body as is desired.

After folding and sealing the wrapper material to form a moving tube, inside of which are contained the equally spaced objects to be wrapped, the portions of this tube between these objects are tuck-inpleated and sealed. In subsequent operations the tuck-inpleated portions between the spaced objects are cut through transversely to form an individually wrapped package with tuck-inpleated and sealed ends.

Heretofore, the tuck-inpleating and sealing have been performed as separate operations, and one problem with this arrangement is that the pleat which is obtained is not uniform, and hence, the seal is also not uniform. This is apparently due to the fact that after the inpleat is formed the inpleat in the moving wrapper tube is carried for at least a distance equal to the space occupied by the enclosed object to be wrapped, before the inpleat is sealed in place. While transversing this distance, the inpleat tends to pull apart or slip due to the rapid-linear movement of the tube or to vibrations from the constant acceleration and deceleration of the machinery so that an uneven inpleat is presented for sealing.

Accordingly, it is the primary aim of the invention to provide a method and apparatus for simultaneously performing the tuck-inpleating and sealing steps in high speed manufacturing and wrapping processes. A related object is to provide a method and apparatus of the above kind that reliably forms individual packages with uniform tucked and sealed end tabs.

As applied to sanitary napkin manufacture, a more specific object of this invention is to provide an apparatus for simultaneously tuck-inpleating and sealing those portions of a tubular napkin wrapper between the spaced apart pads to form the napkin tabs, as a continuous production line operation.

Another object is to provide an apparatus as characterized above that can be operated at high speed with little vibration. A further object is to provide such an apparatus which, once properly set up, remains exactly synchronized with respect to its own cooperating parts as well as the remainder of the sanitary napkin assembly machinery.

Other objects and advantages will become apparent as the following description proceeds, taken in conjunction with the accompanying drawings, in which:

FIG. 1 is a fragmentary top elevation of an apparatus embodying the present invention;

FIG. 2 is a section taken approximately along line 2—2 of FIG. 1;

FIG. 5 is a fragmentary section taken approximately along line 5—5 of FIG. 3;

FIG. 6 is a fragmentary section taken approximately along line 6—6 of FIG. 5; and FIG. 7 is a fragmentary perspective of a sanitary napkin that has been pleated and sealed in accordance with the present invention.

DESCRIPTION OF THE INVENTION

Figure 3:
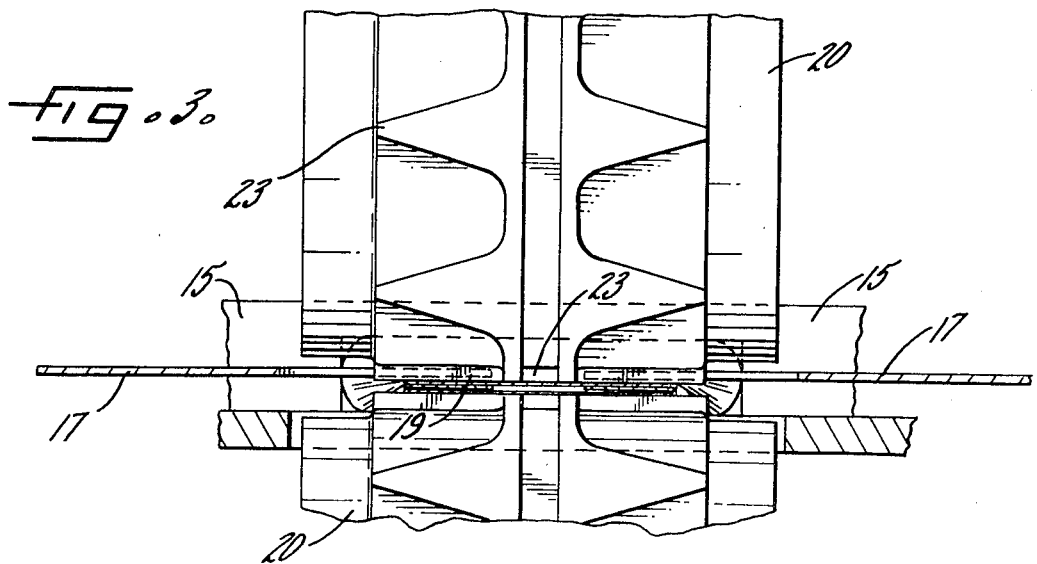
FIG. 3 is an enlarged section taken approximately along line 3—3 of FIG. 1.

While the present invention is susceptible of various modifications and alternative forms a preferred embodiment has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Turning now to the drawings, there is illustrated in FIG. 1 the pleating and sealing portion of an apparatus 10, embodying the present invention, for making sanitary napkins from a linearly moving tube 11 comprising a fluid pervious pad wrapper 12 and pads made of fluid absorbent wadding 14 arranged inside the tube 11 at pre-determined and equally spaced intervals. The tube 11 moves into the pleating and sealing section indicated generally at 13 from the left and exits to the right. As the tube 11 passes through the pleating and sealing section 13, it is guided from any up, down or sideways displacement by bottom, top and side plates 15, which form a rectangular channel through which the moving tube 11 passes. The tube portions between the spaced absorbent pads 14, generally indicated at 16, are inpleated and sealed to form the flat tab ends of the sanitary napkin.

In accordance with the invention, the ends are tuck-inpleated and sealed simultaneously by a pair of tucking devices in the form of generally circular discs 17 positioned on either side of the moving tube 11 which fold an inpleat 18 in opposed walls of the tube portions 16 between the spaced pads 14, and a pair of sealing devices in the form of generally cylindrical rolls 20 positioned at 90° angles from said tucking devices for bonding together the folds of the inpleat 18 as it is formed by the tucking devices.

The tucking discs 17 are located perpendicular to the centerline of the rectangular channel formed by the side plates 15, shown in FIG. 1 and are parallel to, and on the horizontal centerline of this rectangular channel as shown in FIG. 2. The tucking discs 17 are mounted on the frame by means of spring biased pivotable rods 23 which allow the discs 17 to lift from the wrapper material to avoid breaking them in the event that the wrapper material 12 jams the apparatus. The tucking discs 17 are rotatably driven on a vertical axis in the directions shown by the arrows 17a. Since the discs 17 rotate constantly and at the same speed as the tube 11, tearing or scoring of the tube 11 is prevented, and little or no jarring or vibration is created that might cause the folded inpleat to pull apart of slip.

Each disc 17 has a plurality of finger-like projections 19, extending around a portion of the disc, which perform the inpleating function. In the preferred embodiment of the invention each disc 17 has two groups of projections disposed 180° around the disc from each other. These finger-like projections 19 crease and fold an inpleat of the desired configuration in opposed walls of tube portions 16 as the tucking discs 17 rotate. The peripheral speed of the fingers 19 is adjusted to equal the linear speed of tube 11 so that there is no relative speed differential between the tube 11 and the tucking finger projections 19. This feature is desirable so that sealing of the inpleat can be performed in the space between the fingers 19 as will be subsequently described. The groups of projections are spaced so that the pads 14 pass the rotating discs 17 without being contacted by the projections 19.

In the preferred embodiment, the sealing rolls 20 are heat-sealing devices which activate a suitable bonding agent on the wrapper material 12. The bonding agent may be added to the material, but, in the preferred construction, the wrapper material 12 is formed using a heat activatable bonding agent and there is a sufficient amount of such material to reliably seal the tab ends of the napkins.

Each sealing roll 20 is cam-shaped having a major diameter portion 21 and a relieved or minor diameter portion 22. The rolls are journalled on brackets 28 so that their major diameters 21 just clear the fingers 19 of the tucking discs 17. The rolls 20 are rotatably driven at a constant rate in the directions of the arrows 20a.

Figure 4:
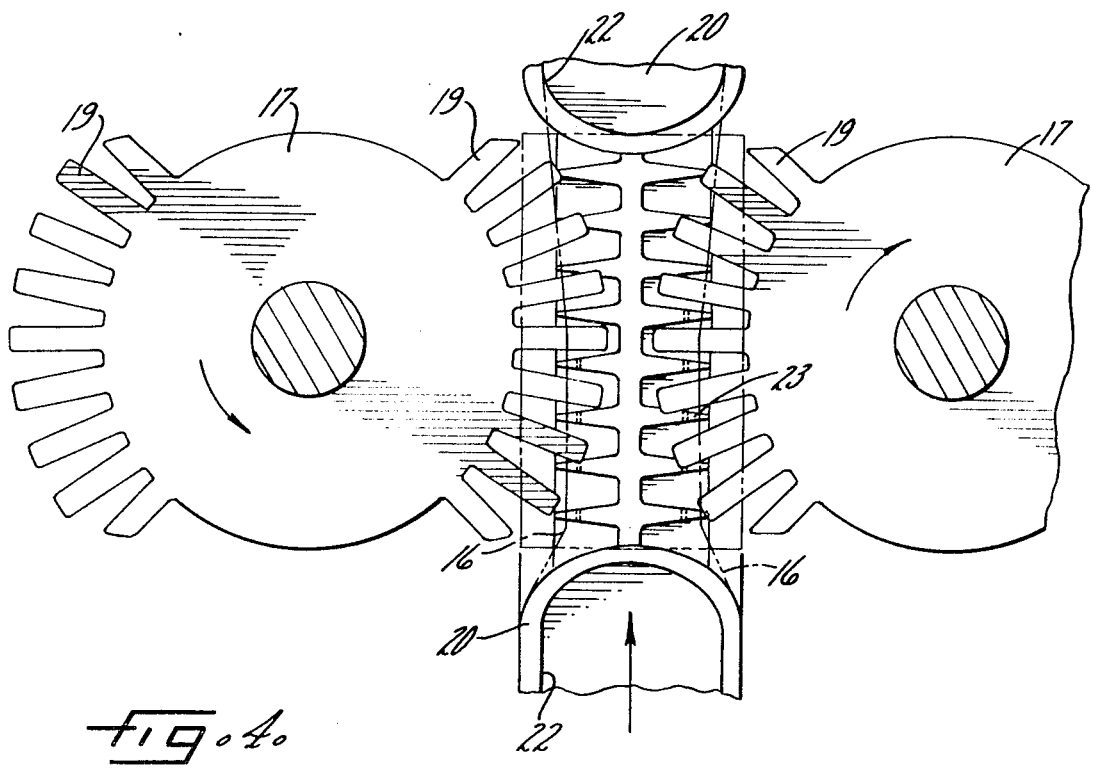
FIG. 4 is an enlarged section taken approximately along line 4—4 of FIG. 2.

Extending outward from the major diameter 21 of the heat sealing rolls 20 are tube engaging ironing elements 23 that mesh with the fingers 19 of the tucking devices as the rolls and discs 17 rotate so as to bond together the folds of the inpleat 18 as it is being formed between the fingers 19. The inpleat is formed and sealed simultaneously. The tube engaging elements 23 form a raised pattern on the heat sealing rolls 20 and extend outwardly a distance at least equal to about one-half the thickness of the tucking disc 17 (see FIG. 3) and are arranged on the rolls 20 so that they fit between the fingers 19 of tucking disc 17 (see FIG. 4). As a result, the pad wrapper 12 is pressed by the ironing elements 23 in a pattern defined by the spaces between the fingers 19. This generates a waffle-like pattern, best seen in FIGS. 4 and 7, in which the folded portions of the pad wrapper are sealed together.

The relieved portion or minor diameter 22 of each of the cam-shaped rolls 20 is of such a magnitude that it allows the fluid absorbent pads 14 to pass between the rolls 20 without being compressed or displaced. And the rolls are proportioned and driven at a speed causing the ironing elements 23 to engage and move with the moving tube 11 without pulling or distorting the tube.

In a later operation the portions 16 are severed so as to define individual napkins with uniformly tucked inpleated and sealed ends. The method and apparatus described above produces such uniform ends since the tucking and sealing operation is performed simultaneously. There is no opportunity for a previously formed inpleat to become distorted before sealing is attempted.

The sealing rolls 20 and tucking discs 17 create little vibration even when operated at high speeds since they are uniformly rotated in one direction. This also insures proper synchronization and cooperation of the tucking and sealing devices since, once properly set up, a common drive precludes lack of synchronization.

I claim:

1. In an apparatus for wrapping individual objects in a linearly moving tube of wrapper material, the combination comprising, a pair of generally circular and rotatably driven tucking devices positioned on either side of said moving tube for folding an impleat in opposed walls of the tube portions between said spaced objects, said tucking devices each having a plurality of closely spaced fingers for folding said inpleat in opposed walls of said tube portions, and a pair of generally circular and rotatably driven sealing devices positioned at 90° angles from said tucking devices, each said sealing device having a plurality of tube engaging elements formed to fit within said spaces of said fingers to mesh with the fingers of said tucking devices to bond together the folds of said inpleat as it is being formed by the fingers of said tucking devices.

2. The method of forming uniform tab ends on sanitary napkins comprising the step of simultaneously tuck-inpleating and longitudinally sealing, with elongated, relatively narrow waffle-like patterns, a flat extended portion of a tube of fluid previous wrapper material lying between pads of fluid absorbent material spaced along said tube by serially inpleating said tube at a plurality of discrete, adjacent zones along opposing sides of said tube, and pressing the tube at 90° angles to said adjacent zones as it is being inpleated to form a longitudinally extending seal having a plurality of areas extending outwardly therefrom and meshing with said discrete, adjacent zones.

3. In an apparatus for making flat tab ends on sanitary napkins from a linearly moving tube of fluid pervious wrapper material containing linearly spaced pads of fluid absorbent material, the combination comprising, a pair of tucking devices positioned on either side of said moving tube each said tucking device having a plurality of fingers for folding an inpleat in opposed walls of the tube portions between said spaced pads, said tucking devices being generally circular and rotatably driven so that said fingers engage and move with said moving tube, said fingers being disposed around only a portion of the periphery of said rotatable tucking device so that said fingers will engage and fold said inpleat only between said spaced pads, and a pair of sealing devices positioned at 90° angles from said tucking devices, said sealing devices being generally cylindrical rotatably driven and having a plurality of tube engaging elements formed to fit between said fingers to mesh with said fingers of said tucking devices to bond together the folds of said inpleat as it is formed by the fingers of said tucking devices.

4. The combination of claim 3 in which said portions include a heat activatable bonding agent, and said sealing device elements are heated ironing elements for heating and pressing said portions to activate said heat activatable bonding agent and bond together the folds of said inpleat.

* * * * *